(12) United States Patent
Hsu

(10) Patent No.: US 7,810,966 B2
(45) Date of Patent: Oct. 12, 2010

(54) CABLES FIXING APPARATUS FOR BACKLIGHT MODULE

(75) Inventor: Wei-Chen Hsu, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 12/749,515

(22) Filed: Mar. 30, 2010

(65) Prior Publication Data

US 2010/0182796 A1  Jul. 22, 2010

Related U.S. Application Data

(62) Division of application No. 11/453,029, filed on Jun. 15, 2006, now Pat. No. 7,717,606.

(51) Int. Cl.
*F21V 21/00* (2006.01)

(52) U.S. Cl. ....................... 362/391; 362/633

(58) Field of Classification Search ............ 362/633, 362/391, 630, 632, 634; 439/445; 359/58, 359/65
See application file for complete search history.

(56) References Cited

U.S. PATENT DOCUMENTS

| | | | | |
|---|---|---|---|---|
| 5,667,295 A | * | 9/1997 | Tsui | 362/249.15 |
| 6,870,753 B2 | * | 3/2005 | Hamada | 365/145 |
| 7,011,443 B2 | * | 3/2006 | Chen | 362/633 |
| 7,116,385 B2 | * | 10/2006 | Yeom | 349/58 |
| 7,298,433 B2 | * | 11/2007 | You et al. | 349/58 |
| 7,303,326 B2 | * | 12/2007 | Fu et al. | 362/630 |
| 2004/0160546 A1 | * | 8/2004 | Huang et al. | 349/58 |
| 2005/0094054 A1 | * | 5/2005 | You et al. | 349/58 |

* cited by examiner

*Primary Examiner*—Thomas M Sember
(74) *Attorney, Agent, or Firm*—Jianq Chyun IP Office

(57) ABSTRACT

A cables fixing apparatus for a backlight module includes a rear frame having a leading-out area in a side edge provided with a plurality of protrusions thereof; a lamp cable led out from said leading-out area; and a mold frame provided with a plurality of crooks, wherein each of said crooks faces one of said protrusions on said side edge of said rear frame so as to define a cable groove, and said lamp cable is accommodated and fixed in said cable groove along an edge of said rear frame. These protrusions of the rear frame and these crooks of the mold frame are utilized to arrange and fix the lamp cable in the cable groove to avoid the fracturing problem of solder joint of lamp and prevent the interference as assembling because of the displacement issue of the lamp cable.

6 Claims, 3 Drawing Sheets

CABLES FIXING APPARATUS FOR BACKLIGHT MODULE

CROSS-REFERENCE TO RELATED APPLICATION

This application is a divisional application of and claims priority benefit of an application Ser. No. 11/453,029, filed on Jun. 15, 2006, now allowed. The entirety of the above-mentioned patent application is hereby incorporated by reference herein and made a part of this specification.

BACKGROUND

1. Field of the Invention

The invention generally relates to a backlight module, and more especially, to a cables fixing apparatus for the backlight module.

2. Description of the Prior Art

Recently, liquid crystal display (LCD) has been utilized widely. With the improvement of the drive technology of LCD, the LCD has the features of low power consumption, thin type, and low drive voltage, and has been widely used on mobile telecommunication apparatus, notebook, desktop display, and any kind of the projection equipments. One of the most commonly used LCD is thin-film transistor (TFT) LCD. Because the TFT LCD does not illuminate itself, the backlight module is utilized to provide a light source to the TFT LCD. No matter what kind of the light source is used, the wire of the backlight module must be let out from the leading-out area thereof during the backlight module assembly process so as to connect with the power supply.

Generally speaking, the conductive terminals of the light source are connected with the external wires by soldering or copper strip. The joints between the conductive terminals of the light source and the external wires tend to be separated when the external wires are subjected to external stress due to pulling or dragging of the wires. In addition, the abovementioned stress may be transmitted to the lamp thereby causing the break damage of the lamp.

In general, the aluminum plate is used to be the base plate in order to provide a support to other elements of the backlight module. FIG. 1 shows a schematic partial view of the assembled backlight module in accordance with the prior art. As shown in FIG. 1, the backlight module 10 includes a rear frame 20, a plurality of crooks 30 and a light source (not shown in FIG. 1). The wires 40 of the light source extend outwardly from the rear frame 20 and connect to a connecter (not shown) which, in turn, connects with a power. As shown in FIG. 1, a wire holder or the crooks 30 are conventionally utilized to fix the exposed wires 40. However, in this kind of fixing method, the wires 40 may go beyond the edge, for example in the direction A as shown in the figure, and may interfere with other mechanism to cause the wires 40 to be damaged during the backlight module assembly process.

SUMMARY OF THE INVENTION

In order to solve the problems mentioned above, the invention provides a cables fixing apparatus for the backlight module. The protrusions of the rear frame and the crooks of the mold frame are utilized to fix the lamp cable so as to avoid the displacement issue of the lamp cable and prevent the lamp from the damage by an external stress due to pulling or dragging of the lamp cable.

The protrusions of the rear frame and the crooks of the mold frame can be utilized to fix the lamp cable in limited space so as to meet the narrow bezel design. Besides, because of cable holder is unnecessary, the production cost will be lower down.

Accordingly, a cables fixing apparatus for a backlight module according to an embodiment of the invention includes a rear frame having a leading-out area in a side edge provided with a plurality of protrusions thereof; a lamp cable; and a mold frame provided with a plurality of crooks, wherein the crooks face to any one of the protrusions on the side edge of the rear frame so as to define a cable groove to fix the lamp cable led out from the leading-out area.

Furthermore, a backlight module according to another embodiment of the invention includes: a rear frame having a plurality of protrusions in a side edge; at least a light source arranged on the rear frame, wherein the light source has a lamp cable; and a mold frame having a plurality of crooks, wherein the crooks face to any one of the protrusions so as to define a cable groove to fix the lamp cable.

Other advantages of the invention will become apparent from the following description taken in conjunction with the accompanying drawings wherein are set forth, by way of illustration and example, certain embodiments of the invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE EMBODIMENT

Figure 1:
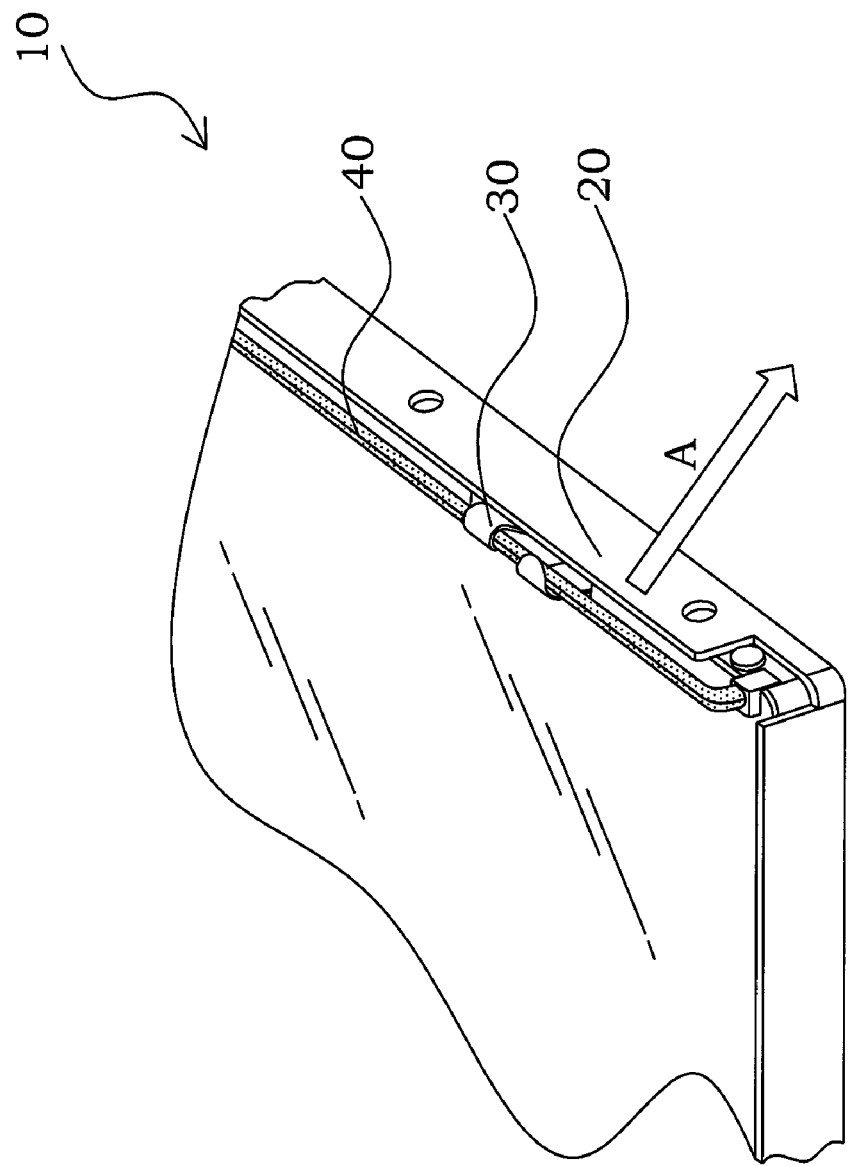
FIG. 1 is a schematic partial view of the architecture of the backlight module, in accordance with the prior art.
Figure 2:
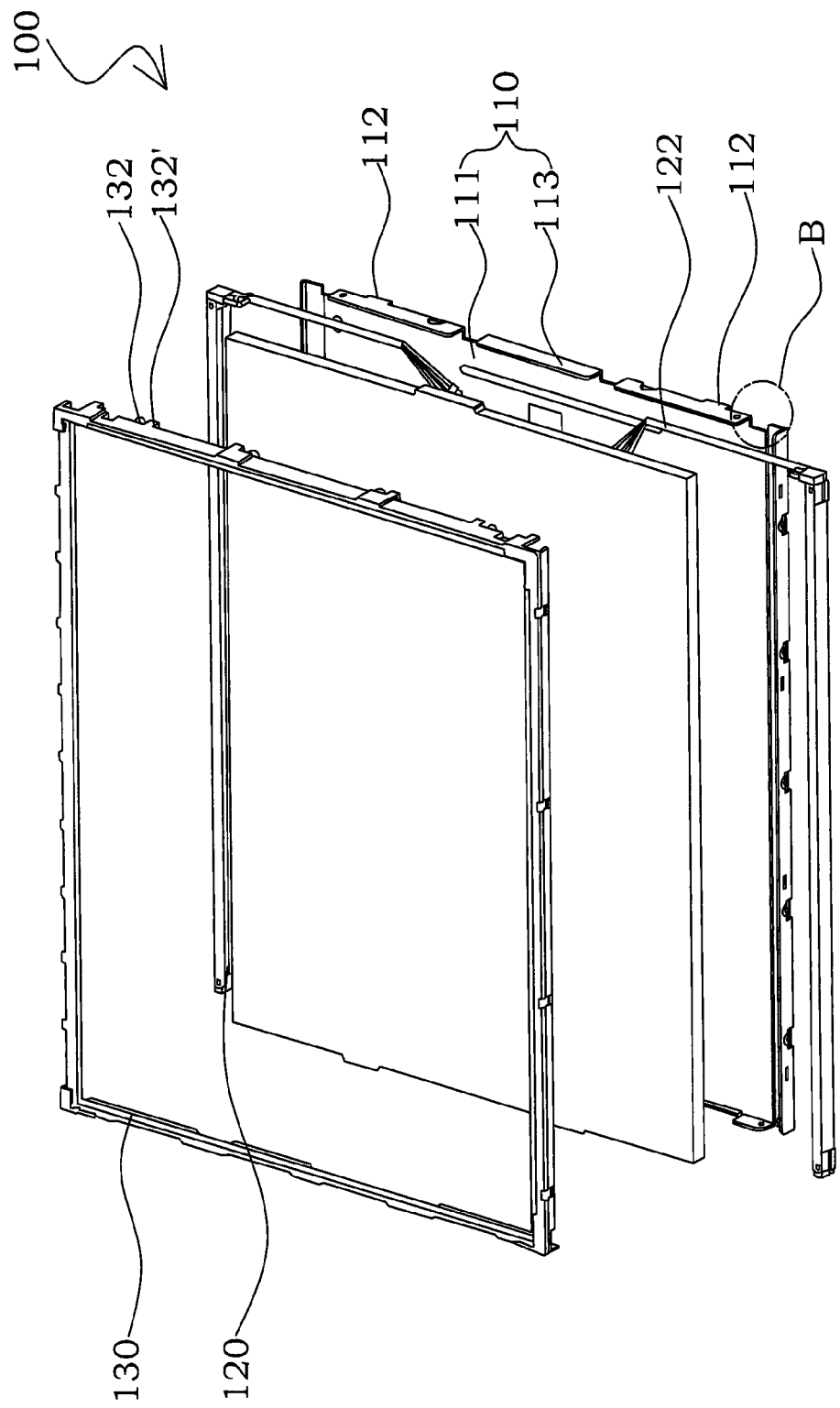
FIG. 2 is a schematic exploded view of the architecture of the backlight module of an embodiment, in accordance with the invention.

FIG. 2 is a schematic exploded view of the architecture of the backlight module of an embodiment in accordance with the invention. In the embodiment, the backlight module 100 includes a rear frame 110, a light source 120, and a mold frame 130, wherein the rear frame 110 and the mold frame 130 can be engaged with each other so as to fix the light source 120 and the lamp cable 122 thereof. Such as shown in FIG. 2, the rear frame 110 is made of the metal materials and has a plurality of protrusions 112 in the appropriate position, for example the side edge 111 of the rear frame 110. In one embodiment, the rear frame 110 further includes a base plate 113. The light source 120 is arranged above the rear frame 110, and has a lamp cable 122 led out from the leading-out area B of the rear frame 110. In order to prevent the damage of the lamp cable 122 from the rear frame 110, any one of a heat shrinkable tube and an insulating material can be utilized to cover the lamp cable 122. The mold frame 130 can be engaged with the rear frame 110 and has a plurality of crooks 132, especially on the side edge of the mold frame 130 for instance, wherein the crooks 132 face to any one of the protrusions 112. The protrusions 112 and the crooks 132 can prevent the lamp cable 122 from the displacement issue causing by an external force. Besides, in the embodiment, any one of the crooks 132' also can project from the side edge 111 of the rear frame 110, and the opening direction of any one of the crooks 132' face to the lamp cable 122.

In the embodiment, the rear frame 110 is made of the metal, the aluminum plate for example, further including a trench utilized to arrange the light source 120. The light source 120 is applied to any one of the direct-light type backlight module and the side-light type backlight module. Furthermore, the rear frame 110 and the protrusions 112 thereof are one-piece form.

Figure 3:
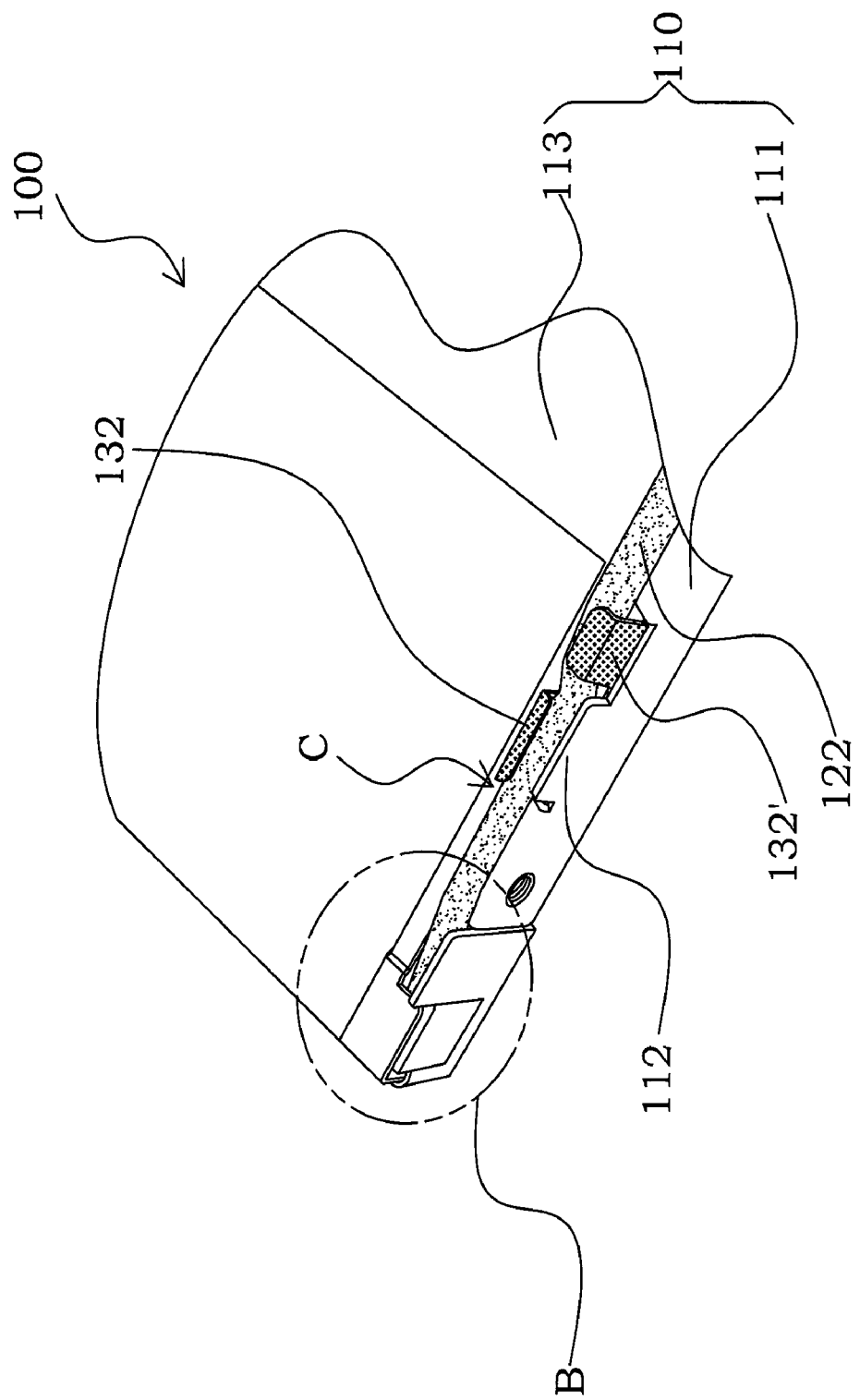
FIG. 3 is a schematic partial view of the architecture of the cables fixing apparatus for the backlight module of another embodiment, in accordance with the invention.

Moreover, please refer to FIG. 3, FIG. 3 is a schematic partial view of the architecture of the cables fixing apparatus. FIG. 3 shows more clearly the relative position between the lamp cable 122, the protrusions 112 of the rear frame 110, and the crooks 132, 132' of the mold frame 130. But the position of the crooks 132, 132' and the protrusions 112 are just an embodiment, these can't limit the invention. Such as shown in the figure, the rear frame 110 is made of the metal and has a leading-out area B in a side edge 111 provided with a plurality of protrusions 112 thereof, wherein the rear frame 110 and the protrusions 112 thereof are one-piece form. In one embodiment, the rear frame 110 further includes a base plate 113. The lamp cable 122 of the light source leads out from the leading-out area B so as to connect with external power supply. The mold frame 130 has a plurality of crooks 132, 132' in the opposite position of the protrusions 112 of the rear frame 110, wherein the crooks 132 face to any one of the protrusions 112 of the side edge 111 of the rear frame 110 so as to define a cable groove C to fix the lamp cable 122 led out from the leading-out area B. In the embodiment, any one of the crooks 132' also can project from the side edge 111 of the rear frame 110, and the opening direction of any one of the crooks 132' face to the lamp cable 122. For preventing the damage of the lamp cable 122 from the protrusion 112 of the rear frame 110, the crooks 132,132' or the other parts, a heat shrinkable tube or an insulating material can be utilized to cover the lamp cable 122 and the protrusions 112. These cables fixing apparatus can be applied to the direct-type backlight module or the side-light type backlight module.

To sum up the foregoing descriptions, the invention utilizes the protrusions of the rear frame to be the barricade so as to avoid the displacement problem. Besides, the protrusions and the crooks formed by mold frame cooperate to define a cable groove to arrange and fix the lamp cable so as to prevent the lamp cable from the broken problem because of an external force. Moreover, all of the description abovementioned can be implemented in limited space and cables holder is unnecessary so that the production cost will be lower down.

The foregoing descriptions of specific embodiments of the invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the claims appended hereto and their equivalents.

What is claimed is:

1. A cables fixing apparatus for a backlight module comprising:
a rear frame having a leading-out area in a side of said rear frame with a plurality of protrusions extending from an upper edge thereof;
a lamp cable led out from said leading-out area; and
a mold frame provided with a plurality of crooks, wherein each of said crooks faces one of said protrusions on said upper edge of said rear frame so as to define a cable groove, and said lamp cable is accommodated and fixed in said cable groove along an edge of said rear frame.

2. The cables fixing apparatus for a backlight module according to claim 1, wherein said rear frame is made of the metal.

3. The cables fixing apparatus for a backlight module according to claim 1, wherein said rear frame further comprises a base plate.

4. The cables fixing apparatus for a backlight module according to claim 1, further comprising a heat shrinkable tube utilized to cover said lamp cable.

5. The cables fixing apparatus for a backlight module according to claim 1, further comprising an insulating material utilized to cover said lamp cables.

6. The cables fixing apparatus for a backlight module according to claim 1, wherein said cables fixing apparatus for backlight module is applied to one of a direct-light type backlight module and a side-light type backlight module.

* * * * *